United States Patent [19]

Amouroux et al.

[11] Patent Number: 4,941,965
[45] Date of Patent: Jul. 17, 1990

[54] PROCESS FOR THE HYDROCRACKING OF A HYDROCARBON FEEDSTOCK AND HYDROCRACKING PLANT FOR CARRYING

[75] Inventors: Jacques Amouroux, Bures s/Yvette; Mehrdad Nikravech, Paris, both of France

[73] Assignee: Electricite de France (Service National), Paris, France

[21] Appl. No.: 197,836

[22] Filed: May 24, 1988

[30] Foreign Application Priority Data

May 22, 1987 [FR] France .................... 87 07216

[51] Int. Cl.$^5$ ............................................. C10G 47/00
[52] U.S. Cl. ..................... 208/108; 208/107; 219/121.36
[58] Field of Search ............ 208/108, 112, 107; 204/172; 219/121.36

[56] References Cited

U.S. PATENT DOCUMENTS

| | | | |
|---|---|---|---|
| 3,033,779 | 5/1962 | Fidelman | 208/127 |
| 3,404,078 | 10/1968 | Golderberger | 219/121.36 |
| 3,541,297 | 11/1970 | Sunnen | 219/121.36 |
| 3,556,976 | 1/1971 | Ishibashi | 204/172 |
| 3,891,562 | 6/1975 | Mogensen et al. | 204/171 |
| 3,923,467 | 12/1975 | Bonet et al. | 219/121.36 |
| 4,077,870 | 3/1978 | Horowitz | 204/172 |
| 4,105,888 | 8/1978 | Fey | 219/121.36 |
| 4,144,444 | 3/1979 | Dementiev et al. | 219/383 |
| 4,631,384 | 12/1986 | Cornu | 219/121.36 |
| 4,705,908 | 11/1987 | Gondouin | 585/661 |

FOREIGN PATENT DOCUMENTS 1059065  7/1979  Canada ............................... 423/650

OTHER PUBLICATIONS

Chem. Abs. 96:125099c.
Chemical Abstracts of Japan, vol. 78, No. 26, p. 124, Abstract 161783h Jul. 1973, "Pyrolysis of Hydrocarbons Using a Hydrogen Plasma".

Primary Examiner—Anthony McFarlane
Attorney, Agent, or Firm—Stevens, Davis, Miller & Davis

[57] ABSTRACT

Plant for the hydrocracking of a feedstock of high-molecular hydrocarbons comprising a fluidized bed of particles within a chamber, injection tube for injecting a fluidizing gas into the bottom of the chamber, tube reactor means on said container for letting said fluidizing gas escape, and a plasma torch of a gas containing hydrogen, which is suitable for injecting the plasma inside the chamber into the fluidized bed of particles.

12 Claims, 3 Drawing Sheets

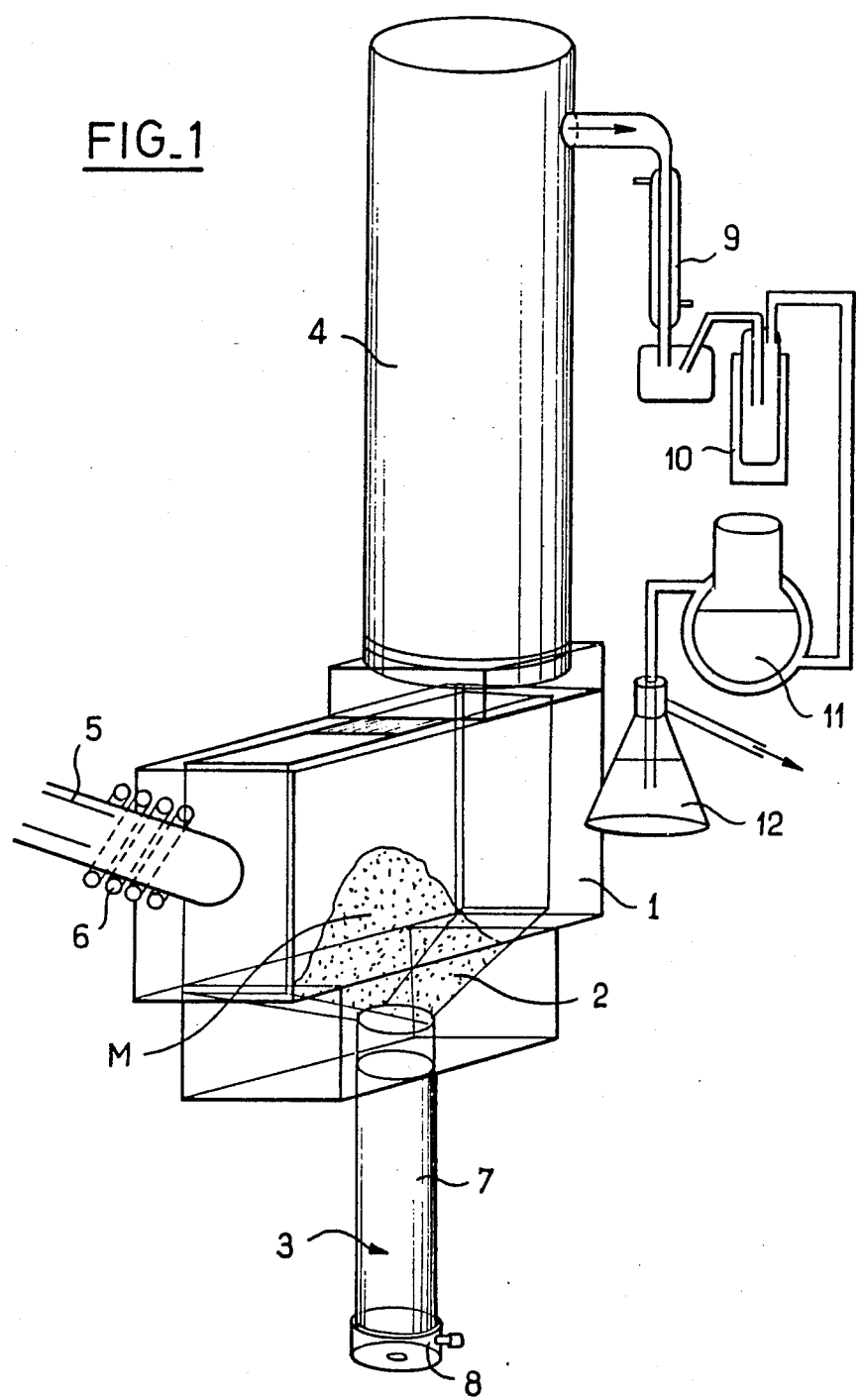
FIG_1

PROCESS FOR THE HYDROCRACKING OF A HYDROCARBON FEEDSTOCK AND HYDROCRACKING PLANT FOR CARRYING

BACKGROUND OF THE INVENTION

1. Field of Invention

The present invention relates to a process for the hydrocracking of a feedstock of high-molecular hydrocarbons and to a hydrocracking plant for carrying out this process.

2. Description of the Prior Art

The known process of hydrocracking, or cracking in the presence of hydrogen, consists of a catalyzed reaction involving the pyrolysis of high-molecular hydrocarbons to give lower-molecular hydrocarbons by the breaking of carbon-carbon bonds. This reaction is endothermic and takes place over a well-defined temperature range. Above this temperature range, the hydrocarbons are degraded by coking.

In the presence of radical hydrogen, the rate of the cracking reaction increases and the viscosity of the products decreases through shortening of the hydrocarbon chains. Furthermore, the stability of the products and the yield obtained are greater than those obtained with a conventional catalytic cracking process.

However, in the production of radical hydrogen, it is necessary to attain high temperatures for its concentration to become significant, and these temperatures for the formation of radical hydrogen are too high to permit a hydrocracking reaction insofar as coking would take place.

SUMMARY OF THE INVENTION

The object of the present invention is therefore to improve the yields obtained in the prior art by using radical hydrogen for the hydrocracking of high-molecular hydrocarbons, while at the same time carrying out the process at a temperature which does not lead to coking of these hydrocarbons.

To this end, the present invention relates to a process for the hydrocracking of a feedstock of high-molecular hydrocarbons, which comprises mixing a plasma containing hydrogen into a bed of solid particles fluidized by a stream of gas in order to produce radical hydrogen entrained in the stream of gas at a temperature below that of the plasma, and reacting the cooled radical hydrogen produced in this way with the said feedstock of high-molecular hydrocarbons in order to form, by hydrocracking, low-molecular hydrocarbons entrained in the stream of gas.

According to other characteristics of the invention:

The stream of gas is circulated, downstream of the fluidized bed, through a reactor in which the radical hydrogen reacts with the high-molecular hydrocarbons.

The stream of gas is made to reside in the reactor for a given period of time for the purpose of adjusting the hydrocracking coefficient and the length of the hydrocarbon fragments obtained.

The solid particles include a catalyst.

The plasma contains hydrogen.

The plasma contains about 80% by volume of argon.

The fluidized bed is of the spurting type.

The plasma is injected laterally into the fluidized bed.

The stream of fluidizing gas contains argon and/or hydrogen.

The feedstock of high-molecular hydrocarbons is injected into the fluidized bed.

The fluidizing gas is preheated upstream of the fluidized bed.

The feedstock of high-molecular hydrocarbons is preheated and vaporized before being injected into the stream of gas.

According to one variant, the feedstock of high-molecular hydrocarbons is injected at the surface of the fluidized bed.

According to another variant, the feedstock of high-molecular hydrocarbons is injected into the reactor downstream of the fluidized bed.

The present invention also relates to a plant for the hydrocracking of a feedstock of high-molecular hydrocarbons, for carrying out the process defined above, which comprises a fluidized-bed device including a chamber possessing means for injecting a fluidizing gas at its bottom end, means for the said fluidizing gas to escape, which contain a mass of solid particles for forming a fluidized bed, and a plasma torch of a gas containing hydrogen, which is suitable for injecting the plasma inside the chamber into the fluidized bed of particles.

A tube reactor is provided and is connected to the outlet of the said chamber.

The plasma torch is connected to a side wall of the chamber so that the plasma is injected laterally into the fluidized bed.

The walls of the chamber are made of alumina.

The bottom of the chamber has a flared shape towards the top and the means for injecting the fluidizing gas come out into its lower part.

The means for injecting the fluidizing gas comprise a tube fitted with heating means and packed with solid particles of a heat exchange material.

BRIEF DESCRIPTION OF THE DRAWING

The invention will be understood more clearly from the following description of a method of carrying out the process and the plant of the invention, the said description referring to the attached drawings; in these drawings:

FIG. 1 is a schematic view of a hydrocracking plant constructed according to the invention.

DESCRIPTION OF THE PREFERRED EMBODIMENTS

Figure 3:
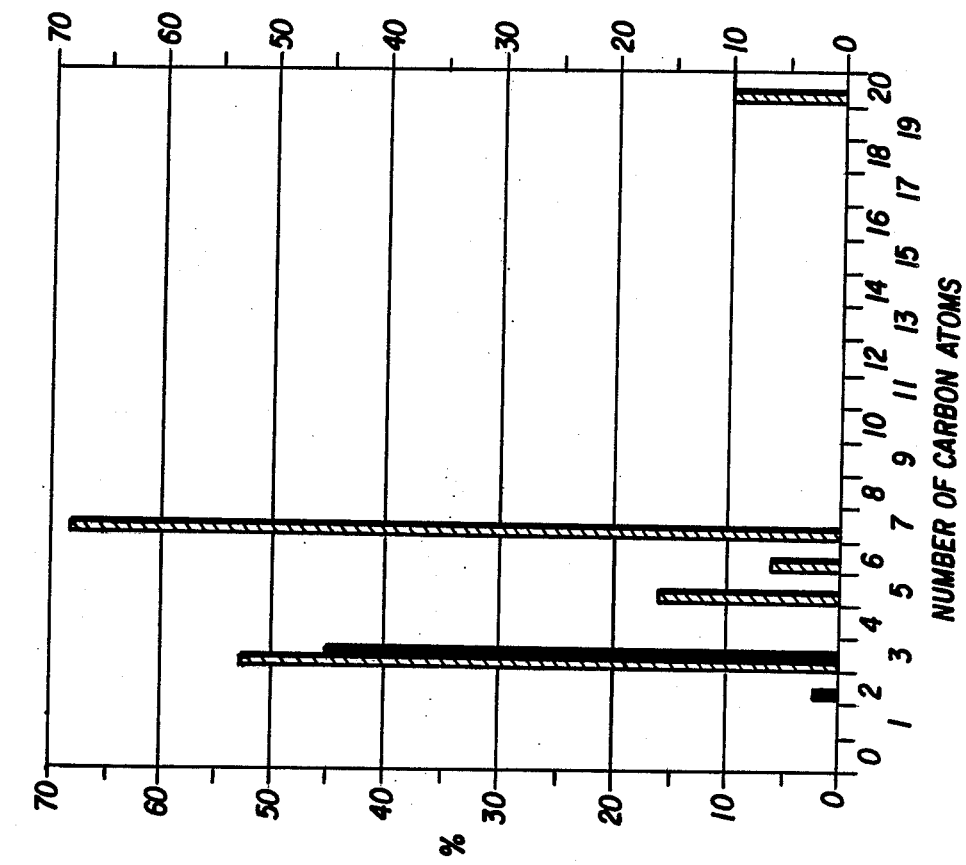
FIGS. 2 to 5 are histograms illustrating the percentage distribution by weight as a function of the number of carbons in the hydrocarbon products collected in the gas and liquid phases at the outlet of the plant illustrated in FIG. 1, during different experiments.

In FIG. 1, the plant comprises a fluidized-bed device including a chamber 1 of parallelepipedal general shape, whose bottom 2, which has a flared shape towards the top, is connected at its lower part to means 3 for injecting a fluidizing gas.

A tube reactor 4 is connected to the upper part of the chamber 1 so that the reactor 4 communicates with the interior of the chamber, and a plasma torch 5, which has inductors 6 in the conventional way, passes through a side wall of the chamber 1 so as to inject a plasma into a mass M of particles located in the chamber 1. The particles of the mass M can include a conventional hydrocracking catalyst and they are intended to be fluidized in a bed of the spurting type by the fluidizing gas entering the chamber.

The inner walls of the chamber 1 are made of 4 mm thick alumina and are lagged on the outside with a 20 mm thick layer of porous bricks bonded to the alumina by refractory cement, this layer of bricks itself being covered with a 14 mm thickness of glass wool surrounded by a layer of asbestos strips.

The means 3 for injecting the fluidizing gas comprise an opaque silica tube 7 with a length of 300 mm and a diameter of 40 mm, which comes out into the bottom of the chamber 1. This tube is surrounded by a 500 W heating tape (not shown) for preheating the fluidizing gas, and it is packed with alumina beads of 2 to 6 mm in diameter, which promote heat exchange between the gas and the wall of the tube. The size of the fluidized $Al_2O_3$ particles is such that 43% by weight of the beads have a diameter between 500 and 350 $\mu$m and 57% by weight have a diameter between 630 and 500 $\mu$m. This particle size distribution permits spurting fluidization, without particles being entrained into the chamber 1, up to a fluidizing gas flow rate of the order of 50 l/min. The lower part of the tube 7 is equipped with a conventional brass injector 8.

The tube reactor consists of a silica tube with a diameter of 85 mm and a length of 500 mm, a thermocouple (not shown) being provided in an intermediate part of the said tube in order to measure the temperature of the stream of gas passing through it. The outlet of the tube reactor 4 is connected to means by which the hydrocarbon products leaving the reactor are recovered and fractionated by condensation.

In the vicinity of the outlet of the tube reactor 4, these means comprise a water-cooled condenser 9 to which a solid carbon dioxide trap 10 and a liquid nitrogen trap 11 are successively connected. Downstream, the liquid nitrogen trap 11 is connected to a washing flask 12 in which a reduced pressure is created by a pump (not shown).

In service, the plant which has now been described operates in the following manner. The mass M of solid particles of a given diameter, containing a catalyst, is fluidized in a spurting bed, in the form of a fountain falling back towards the walls of the chamber, by the constant flow of a fluidizing gas formed by a mixture of argon and/or hydrogen and the vaporized hydrocarbon. The fluidizing gas is preheated in the tube 7 packed with alumina beads, the feedstock of high-molecular aliphatic and/or cyclic hydrocarbons being introduced into the fluidized bed via an injection pipe in which it is vaporized and preheated.

The plasma torch 5 injects a plasma of hydrogen, preferably containing argon, into the side of the fluidized bed of particles, where, by mixing and cooling, it transfers part of its heat to the particles, which exchange this heat with the fluidizing gas and the feedstock of high-molecular hydrocarbons, thus permitting hydrocracking reaction in the presence of radical hydrogen at an adjusted temperature which remains substantially below that of the plasma and which does not therefore give rise to coking of the hydrocarbons.

The hydrocracking reaction continues in the presence of the radical hydrogen in the tube reactor 4 and the residence time of the stream of gas inside the said reactor is determined so as to adjust the hydrocracking coefficient of the high-molecular hydrocarbons as well as the length of the low-molecular hydrocarbon fragments obtained.

The hydrocarbon products leaving the tube reactor 4 are then fractionated according to their condensation points in the water-cooled condenser 9, in the solid carbon dioxide trap 10 ($-60°$ C.) and in the liquid nitrogen trap 11 ($-196°$ C.) for the products of lowest molecular weight.

The plasma torch operates at a frequency of 5 MHz with a power ranging up to 9 kW and an efficiency of 50%. The flow rate of plasma-forming gas is, for example, 42 to 47 liters/min with 35 to 40 liters/min of argon and 7 liters/min of hydrogen. As hydrogen plasmas require more energy than argon plasmas, the voltage at the terminals of the inductor 6 is increased proportionately as the flow rate of hydrogen in the plasma-forming gas is increased.

The use of argon in the plasma-forming gas is of particular interest insofar as the radical species $ArH^{+\cdot}$ is generated; this has an estimated life of a few seconds, which makes it possible to increase the life of the radical hydrogen.

The injection of a hydrogen-based plasma into the fluidized bed of particles in the presence of the vaporized feedstock of high-molecular hydrocarbons thus makes it possible to ensure a rapid heat exchange between the stream of fluidizing gas and the plasma and to produce a large amount of radical hydrogen at a controlled temperature which is satisfactory for carrying out the hydrocracking reaction.

The Examples which follow illustrate how the process of the invention is put into practice.

In these Examples, a $C_{20}$ aliphatic hydrocarbon was treated in order to carry out the hydrocracking reaction and the hydrocarbons leaving the reactor were analyzed by chromatography with the aid of a flame ionization detector equipped with a 10% SE30 column for separation of the liquid hydrocarbons and with a 7% squalane column for separation of the gaseous and low-molecular hydrocarbons.

The chromatograms obtained are shown in the form of histograms in FIGS. 2 to 5.

The results are given in Tables 1 and 2 below.

TABLE 1

Figure 2:
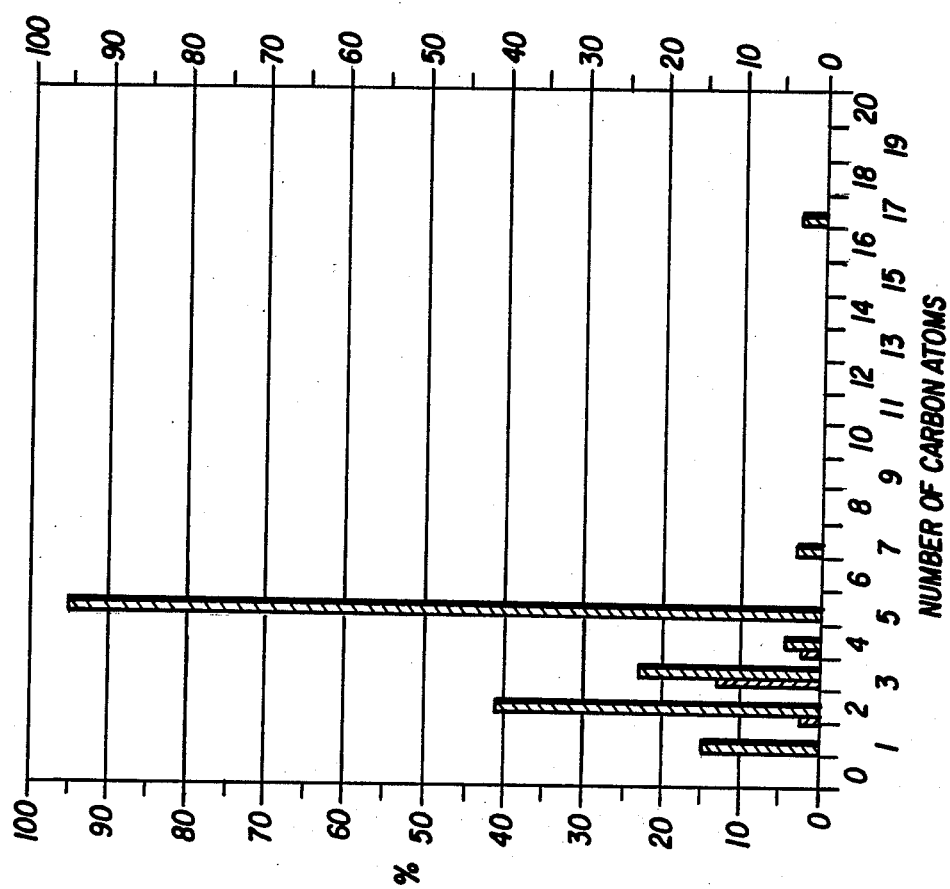
Figure 5:
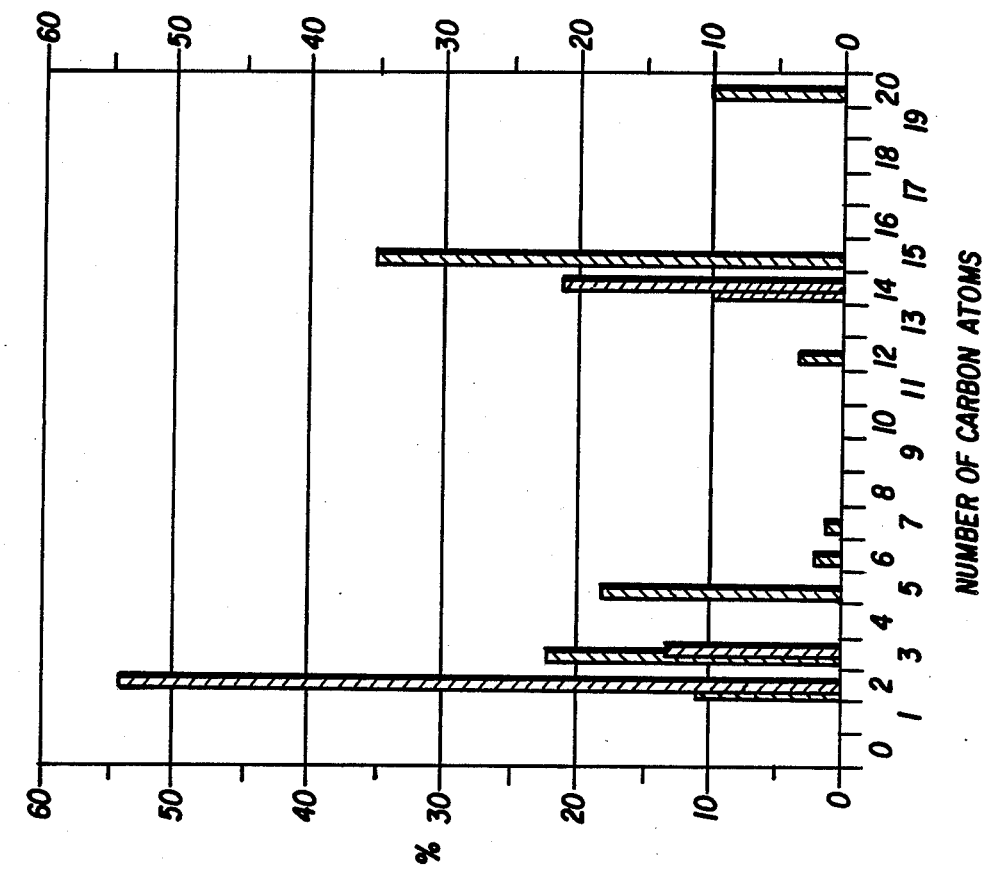
Figure 4:
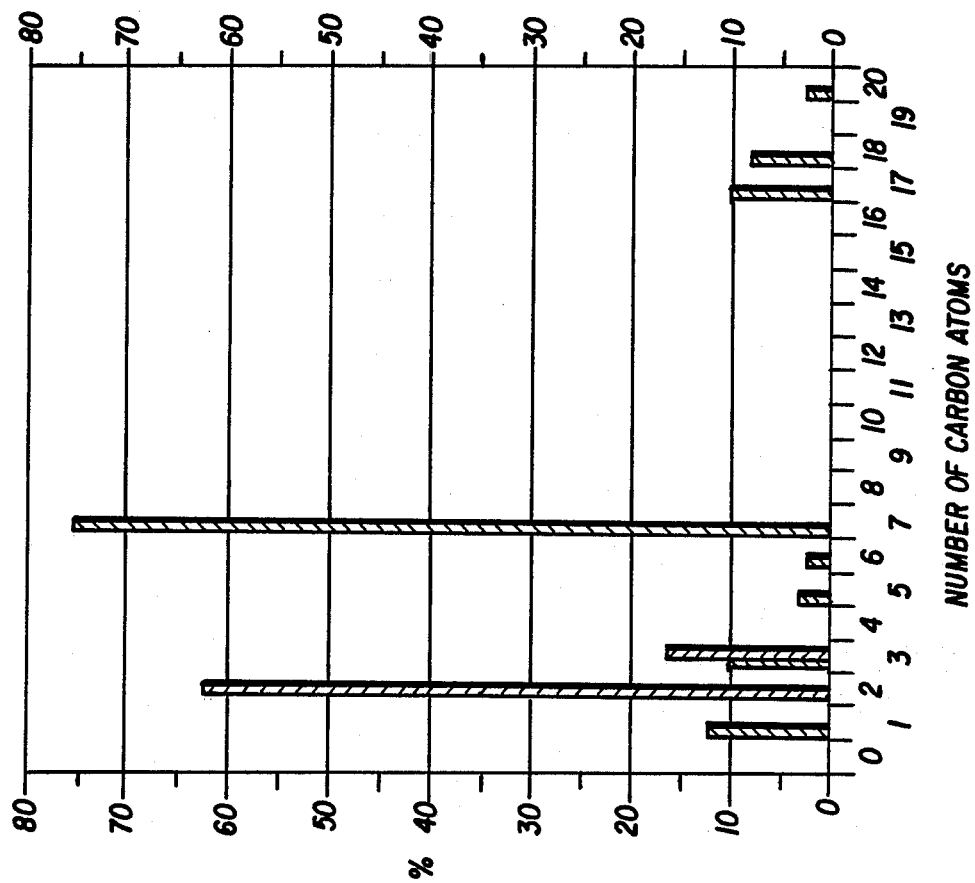

| | Mean temp. in the reactor °C. | Fluidizing gas | | Plasma-forming gas | | Catalyst | High-molecular hydrocarbon ($C_{20}$ aliphatic) (ml/min) |
|---|---|---|---|---|---|---|---|
| | | $H_2$ l/min | Ar l/min | $H_2$ l/min | Ar l/min | | |
| Ex. 1, FIG. 2 | 700–750 | — | 29 | 7 | 31 | $Al_2O_3$ | 5 |
| Ex. 2, FIG. 3 | 600–700 | — | 30 | 4.5 | 28 | $Al_2O_3$ | 5 |
| Ex. 3, FIG. 4 | 450–500 | — | 29 | 6 | 31 | $Al_2O_3$ | 5 |
| Ex. 4, FIG. 5 | 470 | 50 | 20 | 2 | 25 | $Al_2O_3$ | 5 |

Ninety percent by weight of the products obtained during the experiments mentioned are in the gaseous state and contain from 1 to 4 carbon atoms.

The hydrocarbons made up of 5 to 20 carbon atoms, forming ten percent of the products, are in the liquid state.

Separate analysis of these two types of product gives the following results:

EX. 1, FIG. 2

|  |  | saturated |  | olefinic |  | dienic |  |
|---|---|---|---|---|---|---|---|
| Percentage by weight of hydrocarbons obtained in the gas phase | $CH_4$ | 15% | | | | | |
| | $C_2H_6$ | 2% | $C_2H_4$ | 41% | | | |
| | | | $C_3H_6$ | 13% | $C_3H_4$ | 23% | |
| | $C_4H_{10}$ | 2% | $C_4H_8$ | 4% | | | |
| Percentage by weight of hydrocarbons obtained in the liquid phase | $C_5$ | 95% | | | | | |
| | $C_8$ | 2.5% | | | | | |
| | $C_{17}$ | 2.5% | | | | | |

EX. 2, FIG. 3

|  |  | saturated |  | olefinic |  | dienic |
|---|---|---|---|---|---|---|
| Percentage by weight of hydrocarbons obtained in the gas phase | | | $C_2H_4$ | 2% | | |
| | $C_3H_8$ | 53% | $C_3H_6$ | 45% | | |
| Percentage by weight of hydrocarbons obtained in the liquid phase | $C_5$ | 16% | | | | |
| | $C_6$ | 6% | | | | |
| | $C_7$ | 68% | | | | |
| | $C_{20}$ | 10% | | | | |

EX. 3, FIG. 4

|  |  | saturated |  | olefinic |  | dienic |  |
|---|---|---|---|---|---|---|---|
| Percentage by weight of hydrocarbons obtained in the gas phase | $CH_4$ | 12% | | | | | |
| | | | $C_2H_4$ | 62% | | | |
| | | | $C_3H_6$ | 10% | $C_3H_4$ | 16% | |
| Percentage by weight of hydrocarbons obtained in the liquid phase | $C_5$ | 3% | | | | | |
| | $C_6$ | 2% | | | | | |
| | $C_7$ | 75% | | | | | |
| | $C_{17}$ | 10% | | | | | |
| | $C_{18}$ | 8% | | | | | |
| | $C_{20}$ | 2% | | | | | |

EX. 4, FIG. 5

|  |  | saturated |  | olefinic |  | dienic |  |
|---|---|---|---|---|---|---|---|
| Percentage by weight of hydrocarbons obtained in the gas phase | $C_2H_6$ | 11% | $C_2H_4$ | 54% | | | |
| | | | $C_3H_6$ | 22% | $C_3H_4$ | 13% | |
| Percentage by weight of hydrocarbons obtained in the liquid phase | $C_5$ | 18% | | | | | |
| | $C_6$ | 2% | | | | | |
| | $C_7$ | 1% | | | | | |
| | $C_{12}$ | 3% | | | | | |
| | $C_{14}$ | 10% | | | | | |
| | $C_{15}$ | 35% | $C_{15}$ | 21% | | | |
| | $C_{20}$ | 10% | | | | | |

What is claimed is:

1. A process for the hydrocracking of a feedstock of high-molecular hydrocarbons, which comprises mixing a plasma containing hydrogen at a first temperature into a bed of solid particles fluidized by a stream of gas at a second lower temperature in order to produce radical hydrogen entrained in the stream of gas at a temperature below that of the plasma, and reacting radical hydrogen with the said feedstock of high-molecular hydrocarbons to form, under hydrocracking conditions, low-molecular hydrocarbons entrained in the stream of gas.

2. The process according to claim 1, wherein the stream of gas passes through a reactor in which the radical hydrogen reacts with the high-molecular hydrocarbons downstream of the fluidized bed.

3. The process according to claim 2, wherein the stream of gas is maintained in the reactor for a given period of time to adjust the length of the chain of the lower-molecular hydrocarbons obtained.

4. The process according to claim 1 wherein the solid particles include a catalyst.

5. The process according to claim 1, wherein the plasma contains about 80% by volume of argon.

6. The process according to claim 1, wherein the fluidized bed has particles of different sizes to permit spurting fluidization.

7. The process according to claim 1, wherein the plasma is injected laterally or perpendicularly into the fluidized bed.

8. The process according to claim 1, wherein the stream of fluidizing gas contains at least one of argon and hydrogen.

9. The process according to claim 1, wherein the feedstock of high-molecular hydrocarbons is injected into the fluidized bed.

10. The process according to claim 1, wherein the feedstock of high-molecular hydrocarbons is injected at the surface of the fluidized bed.

11. The process according to claim 1, wherein the fluidizing gas is preheated upstream of the fluidized bed.

12. The process according to claim 1, wherein the feedstock of high-molecular hydrocarbons is preheated and vaporized before being injected into the stream of gas.

* * * * *